(12) United States Patent
McGlinchey et al.

(10) Patent No.: US 7,703,037 B2
(45) Date of Patent: Apr. 20, 2010

(54) SEARCHABLE TASK-BASED INTERFACE TO CONTROL PANEL FUNCTIONALITY

(75) Inventors: Andrew John McGlinchey, Seattle, WA (US); Brett Alan Waldbaum, Sammamish, WA (US); Matthew A. Goldberg, Bellevue, WA (US); Randall Knight Winjum, Vashon, WA (US); Mark Richard Ligameri, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 11/109,997

(22) Filed: Apr. 20, 2005

(65) Prior Publication Data

US 2006/0242586 A1    Oct. 26, 2006

(51) Int. Cl.
G06F 3/048    (2006.01)
(52) U.S. Cl. ............... 715/779; 715/747; 715/765; 715/780; 715/816; 715/825
(58) Field of Classification Search .......... 715/747, 715/765, 779–780, 816, 825
See application file for complete search history.

(56) References Cited

U.S. PATENT DOCUMENTS

| | | | |
|---|---|---|---|
| 5,041,967 A * | 8/1991 | Ephrath et al. ........... 715/825 |
| 5,231,691 A | 7/1993 | Yasuda | |
| 5,748,973 A | 5/1998 | Palmer et al. | |
| 5,748,974 A | 5/1998 | Johnson | |
| 6,014,138 A | 1/2000 | Cain et al. | |
| 6,026,388 A | 2/2000 | Liddy et al. | |
| 6,199,061 B1 | 3/2001 | Blewett et al. | |
| 6,262,730 B1 | 7/2001 | Horvitz et al. | |
| 6,289,312 B1 | 9/2001 | Raman | |
| 6,446,135 B1 | 9/2002 | Koppolu et al. | |
| 6,493,702 B1 | 12/2002 | Adar et al. | |
| 6,542,163 B2 * | 4/2003 | Gorbet et al. ............ 715/711 |
| 6,693,651 B2 * | 2/2004 | Biebesheimer et al. ...... 715/837 |
| 6,744,451 B1 * | 6/2004 | Anderson et al. .......... 715/841 |
| 6,778,193 B2 * | 8/2004 | Biebesheimer et al. ...... 715/805 |
| 6,948,133 B2 * | 9/2005 | Haley ..................... 715/780 |
| 6,948,135 B1 * | 9/2005 | Ruthfield et al. ........... 715/854 |

(Continued)

FOREIGN PATENT DOCUMENTS

EP    0503944    3/1992

(Continued)

OTHER PUBLICATIONS

Davidson, James Duncan, Running Mac OS X Panther, Dec. 2003, 1$^{st}$ Edition, Chapter 2.*

(Continued)

*Primary Examiner*—Ting Lee
*Assistant Examiner*—Ashraf Zahr
(74) *Attorney, Agent, or Firm*—Westman, Champlin & Kelly, P.A.

(57) ABSTRACT

A computer-implemented method is disclosed. The method is for enabling a user to efficiently navigate to a portion of a user interface configured to support performance of a particular task. The method includes receiving from the user an input that includes a description of the particular task. A result set is returned to the user and includes a plurality of candidate tasks that correspond to the description. The candidate tasks are displayed relative to an indication of at least one corresponding applet.

14 Claims, 7 Drawing Sheets

U.S. PATENT DOCUMENTS

| | | | |
|---|---|---|---|
| 7,043,700 B1 * | 5/2006 | Bertram et al. | 715/811 |
| 7,062,711 B2 | 6/2006 | Kethireddy | |
| 7,073,126 B1 | 7/2006 | Khandekar | |
| 7,113,950 B2 | 9/2006 | Brill et al. | |
| 7,124,129 B2 | 10/2006 | Bowman et al. | |
| 7,137,071 B2 * | 11/2006 | Fuller et al. | 715/771 |
| 7,149,550 B2 | 12/2006 | Kraft et al. | |
| 7,185,001 B1 * | 2/2007 | Burdick et al. | 707/3 |
| 7,254,784 B2 * | 8/2007 | Chang | 715/810 |
| 7,440,941 B1 | 10/2008 | Borkovsky et al. | |
| 2002/0080157 A1 * | 6/2002 | Chickles et al. | 345/700 |
| 2002/0103789 A1 | 8/2002 | Turnbull et al. | |
| 2002/0105550 A1 * | 8/2002 | Biebesheimer et al. | 345/835 |
| 2002/0118220 A1 | 8/2002 | Lui et al. | |
| 2002/0152255 A1 | 10/2002 | Smith, Jr. | |
| 2002/0188612 A1 | 12/2002 | Yu et al. | |
| 2003/0046088 A1 | 3/2003 | Yuschik | |
| 2003/0200254 A1 | 10/2003 | Wei | |
| 2004/0046789 A1 | 3/2004 | Inanoria | |
| 2005/0060138 A1 | 3/2005 | Wang et al. | |
| 2005/0066270 A1 * | 3/2005 | Ali et al. | 715/513 |
| 2005/0071777 A1 * | 3/2005 | Roessler et al. | 715/810 |
| 2005/0076023 A1 | 4/2005 | Wu et al. | |
| 2005/0081152 A1 | 4/2005 | Commarford et al. | |
| 2005/0131701 A1 | 6/2005 | Cross et al. | |
| 2005/0138559 A1 | 6/2005 | Santos-Gomez et al. | |
| 2005/0166148 A1 | 7/2005 | Garding | |
| 2005/0240558 A1 * | 10/2005 | Gil et al. | 707/1 |
| 2005/0278728 A1 | 12/2005 | Klementiev | |
| 2005/0283473 A1 | 12/2005 | Rousso et al. | |
| 2006/0048060 A1 * | 3/2006 | Mohr et al. | 715/747 |
| 2006/0053384 A1 * | 3/2006 | La Fetra et al. | 715/765 |
| 2006/0101347 A1 | 5/2006 | Runov et al. | |
| 2006/0143575 A1 | 6/2006 | Sauermann | |
| 2006/0150112 A1 * | 7/2006 | Marchev | 715/762 |
| 2006/0168522 A1 * | 7/2006 | Bala | 715/712 |
| 2006/0184899 A1 * | 8/2006 | Klassen et al. | 715/825 |
| 2006/0190429 A1 * | 8/2006 | Sidlosky et al. | 707/3 |
| 2006/0200827 A1 * | 9/2006 | Sidlosky et al. | 719/310 |
| 2006/0259479 A1 | 11/2006 | Dai | |
| 2007/0033172 A1 | 2/2007 | Williams et al. | |
| 2007/0143704 A1 | 6/2007 | Laird-McConnell | |
| 2008/0065617 A1 | 3/2008 | Burke et al. | |

FOREIGN PATENT DOCUMENTS

| | | |
|---|---|---|
| EP | 0317479 | 10/1998 |
| EP | 1215657 | 6/2002 |
| WO | WO 01/44932 A | 6/2001 |
| WO | WO 0212982 | 2/2002 |

OTHER PUBLICATIONS

European Search Report.
Mahesh, K.; "Advanced Search Capabilities in Oracle8I intermedia Text," Oracle Corporation, Online! Nov. 1999, pp. 1-6.
Chinese Official Action.
U.S. Appl. No. 11/372,545, filed Mar. 10, 2006 entitled, "Searching for Commands to Execute in Applications".
U.S. Appl. No. 11/701,125, filed Feb. 1, 2007 entitled "Searching for Commands to Execute in Applications".
XAML—A Business Perspective, 2 pgs.
Speech-Enablement of Eclipse IDE and Eclipse Rich Client. TV Raman et al. IBM Search, 13 pgs.
Create Rich Client Apps. with the Dom. Padilla, pp. 1-7 (Feb. 14, 2004).
International Search Report.
Bass & Bunker, L. & R.; "A Generalized User Interface for Application Programs," Computing Programs, V. 24, No. 12, Dec. 1981, pp. 796-800.
Shneidermann, B. et al.; "Clarifying Search: A User-Interface Framework for Text Searches,"D-Lib Magazine, Jan. 1997, 18 pgs.
Little & Miller, G. & R.; "Translating Keyword Commands into Executable Code", UIST '06, pp. 135-144.
EU Communication dated Nov. 2009.

* cited by examiner

SEARCHABLE TASK-BASED INTERFACE TO CONTROL PANEL FUNCTIONALITY

BACKGROUND OF THE INVENTION

The present invention pertains to user access to means for adjusting settings and configuration alternatives associated with a computing device. More specifically, the present invention pertains to a task-based interface for adjusting settings and configuration alternatives.

Many software programs have a large number of options for adjusting settings and configuration alternatives, and commonly have a large and complicated user interface scheme for allowing a user to make such adjustments. One disadvantage associated with most of these user interfaces is that a user is forced to map from what he'd like to do (for example, "erase the log of what web pages I've visited") to the part of the user interface where the task can be accomplished (e.g., the Network and Internet category, Internet Options applet, General tab, Clear History button).

The control panel component associated with an operating system is a prime example of one environment in which the described challenges arise. There are hundreds of tasks that a user can accomplish with controls implemented through a typical control panel. In many cases, when a user opens the control panel, they are presented with a list of control panel applets and often, especially at first, do not know what they do. The applet names, descriptions, and icons give a general idea, but for the most part users must open an applet and "tinker with it" to discover its functionality.

In some cases, parties other than the original creators of the control panel are able to add functionality of their own, most often in the form of new applets. Typically, a customized extension of the core user interface system is accomplished through specialized code generated by a highly skilled application developer. There is a need for an extensible task framework for simplifying the process of making modifications and additions to a scheme for enabling the adjustment of settings and configuration alternatives.

SUMMARY OF THE INVENTION

Embodiments of the present invention pertain to a computer-implemented method for enabling a user to efficiently navigate to a portion of a user interface configured to support performance of a particular task. The method includes receiving from the user an input that includes a description of the particular task. A result set is returned to the user and includes a plurality of candidate tasks that correspond to the description. The candidate tasks are displayed relative to an indication of at least one corresponding applet.

DETAILED DESCRIPTION OF ILLUSTRATIVE EMBODIMENTS

I. Exemplary Environment

Figure 1:
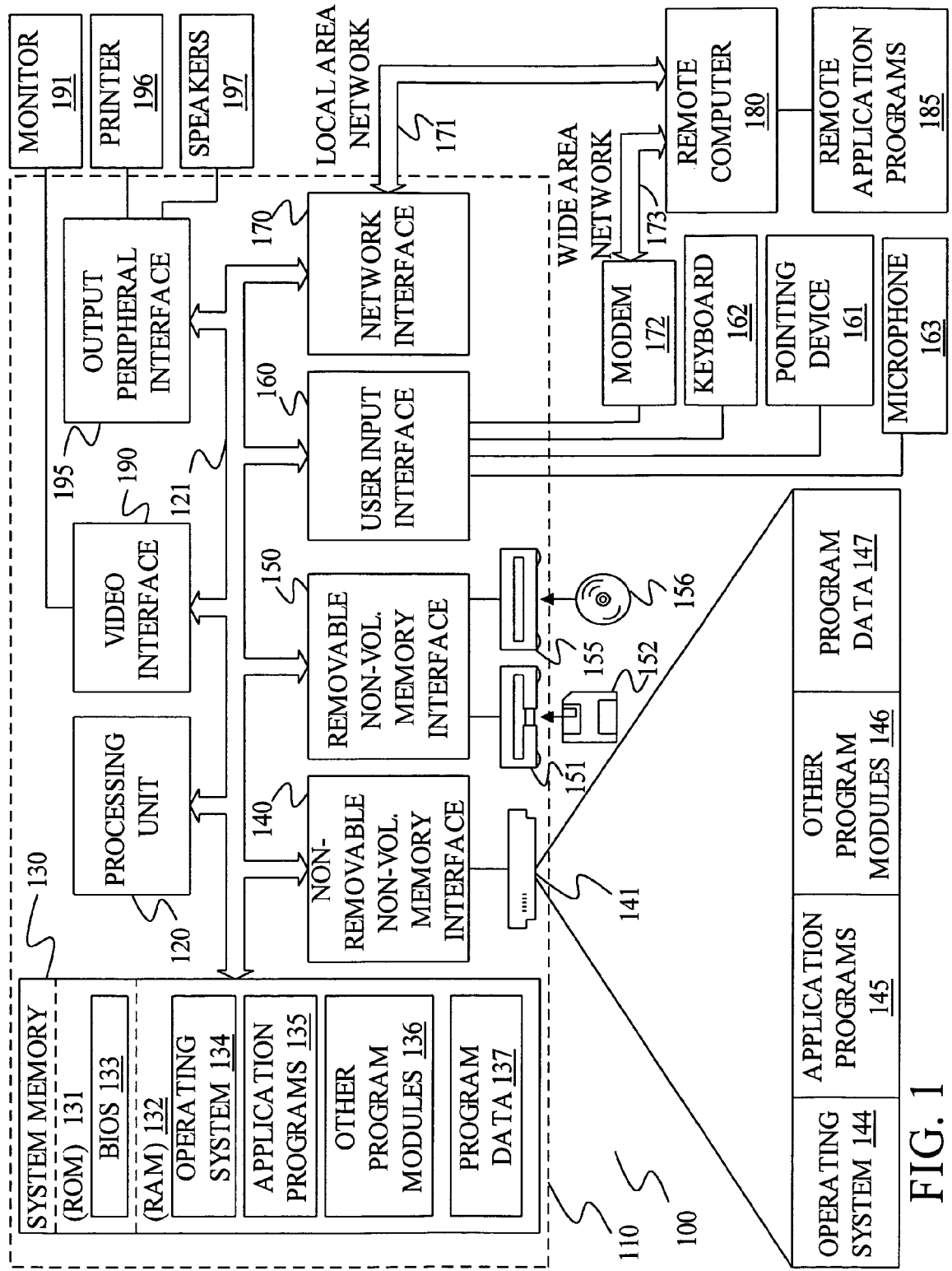
FIG. 1 is a block diagram of one computing environment in which the present invention may be implemented.

FIG. 1 illustrates an example of a suitable computing system environment 100 within which embodiments of the present invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a central processing unit 120, a system memory 130, and a system bus 121 that couples various system components including the system memory to the processing unit 120.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

II. Overview: Task-Based Interface for Adjusting Settings Configuration Alternatives One aspect of the present invention pertains to a task-based interface for facilitating the adjustment of settings and configuration alternatives. The interface generally includes a plurality of selectable tasks presented from the perspective of a user. In one embodiment, the tasks themselves are self-descriptive and provide information about the task itself, like, "make my computer run faster," rather than from an engineering perspective, like "defragment my hard drive".

Another aspect of the present invention pertains to an interface component that enables users to search for particular tasks. In one embodiment, identification of a task can be accomplished even if the words used to search are different than those incorporated into the task itself. For example, a system can be configured to accommodate synonyms such that a search input in the form of "speed up performance" will match "make my computer run faster".

In accordance with one embodiment, a result set provided in response to a search includes matching tasks which, when selected (e.g., clicked on), take the user directly to the part of the interface where the task can be accomplished. In one embodiment, the tasks are arranged in the search results so as to appear related to a corresponding applet that is associated with the task.

In accordance with one aspect of the present invention, the tasks are featured prominently throughout various components of the user interface. For example, the tasks are illustratively incorporated into a display of control panel categories, into a display of various applets under a given category and/or into a display of recently executed tasks. Through prominent incorporation of the tasks, a user is able to easily browse for a desired task. Browsing allows a user who is only vaguely sure what is desired to home in on the right task. The previously described searching allows a user who already knows the nature of a desired task to quickly find the correct user interface component to accomplish the underlying goal.

III. User Interface Components

Figure 2:
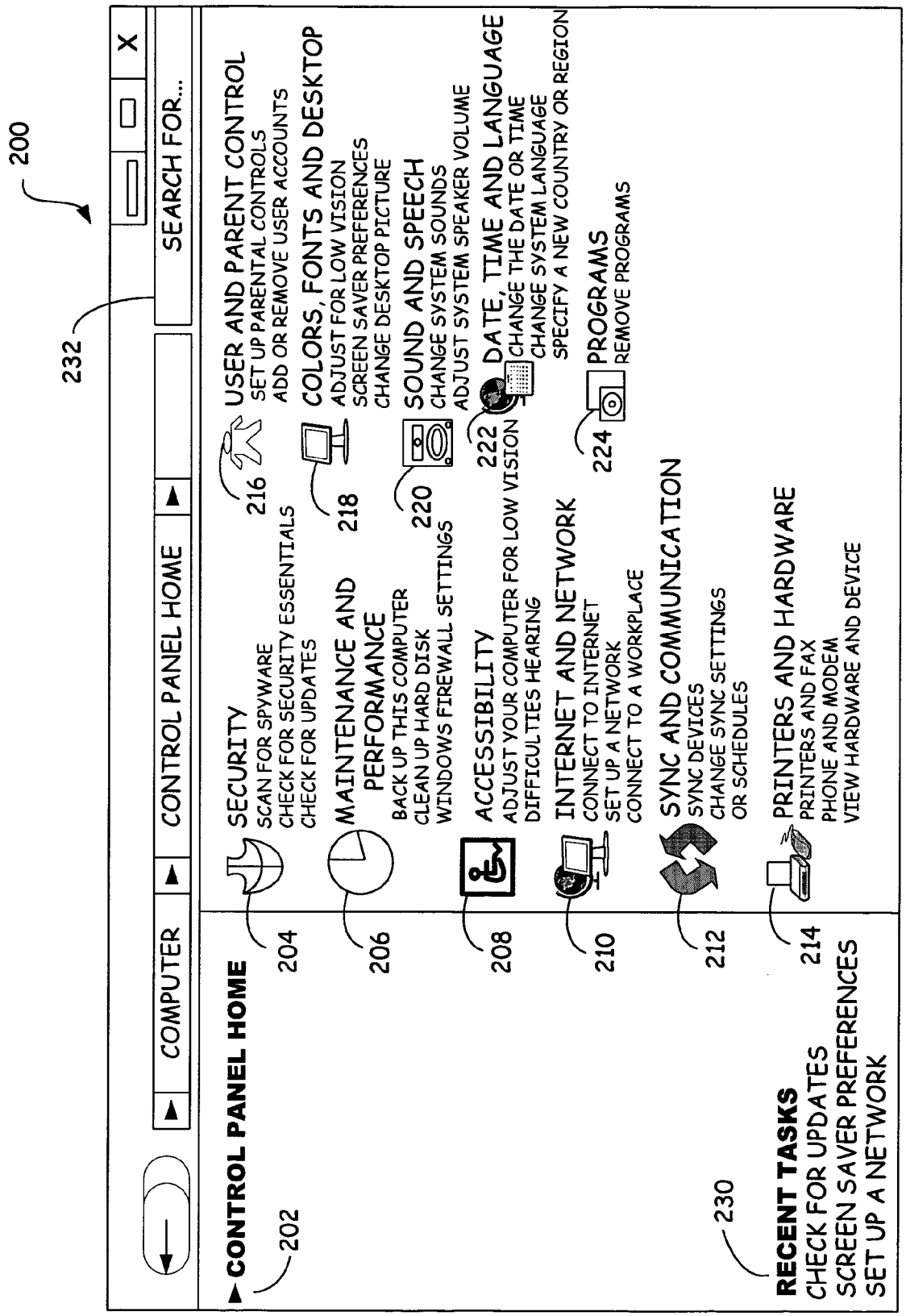
FIG. 2 is an exemplary screenshot representing a control panel home view.

FIG. 2, in accordance with one aspect of the present invention, is a representation of an exemplary screenshot 200. As is indicated at 202, screenshot 200 is a home page associated with a control panel user interface system. While embodiments of the present invention will be described in the context of a control panel interface associated with an operating system, the scope of the present invention is not so limited. The same embodiments could just as easily be applied in the context of any software application that supports an adjustment of settings and/or configuration alternatives.

Screenshot 200 includes a plurality of categories 204-224. Each category includes an icon, and under each category is a listing of corresponding tasks. For example, under the "Maintenance and Performance" category 206, a plurality of corresponding tasks include "Back Up This Computer," "Clean Up Hard Disk," and "Windows Firewall Settings." The tasks under each category provide an informational benefit at least in that they give hints as to the contents of each category. Of course, most categories will actually be associated with a greater number of tasks than those appearing on the control panel home page. Selecting (e.g., clicking) one of the tasks will illustratively cause the display to transition to the part of the interface where that task can be accomplished.

The categories 204-224 are each associated with individual applets that provide an additional user interface through which a user can change related settings and configurations. Selecting (e.g., clicking) one of the categories will illustratively cause the display to transition to a user interface containing the corresponding applets. Again, selecting (e.g., clicking) one of the tasks under a given category will illustratively cause a jump directly to an appropriate and corresponding user interface, for example, a jump directly to the appropriate and corresponding portion of a related applet.

Screenshot 200 also includes a "Recent Tasks" list 230. List 230 includes a plurality of tasks that have been recently selected by the user. Selecting (e.g., clicking) one of the tasks in list 230 will cause a jump directly to an appropriate and corresponding user interface, for example, a jump directly to the appropriate and corresponding portion of a related applet.

Screenshot 200 also includes a searching component 232. A user can illustratively enter search terms into the field associated with component 232. The system is illustratively configured to utilize the entered search terms to identify corresponding tasks. In one embodiment, only the task descriptors themselves are compared to the search terms during the search process. In another embodiment, a set of keywords are associated with a task and compared to the search terms during the search process. In another embodiment, a natural language searching process is supported (e.g., natural language input analyzed to identify corresponding results that may or may not be textually similar). In another embodiment, word breaking is supported. For example, an input "installprinter" would be recognized as the two words "install" and "printer" such that the words are separated prior to execution of a search. This is especially advantageous in the context of languages that do not always require spaces between words. In another embodiment, stemming is supported. For example, if the input "installing" is entered into the search box and there is only a keyword for "install," then an inflection/reduction component would recognize that "installing" has "install" as a stem and eliminate the "ing" ending. This is especially advantageous in the context of languages that have an abundance of inflections.

In one embodiment, applet names and descriptions are compared to the search terms during the search process. In one embodiment, only the exact search terms are compared during the search process. In another embodiment, synonyms associated with the search terms are compared during the search process. Identified corresponding tasks are returned to the user as a set of search results. Selecting (e.g., clicking) a task from the search results will illustratively cause a jump directly to an appropriate and corresponding user interface, for example, a jump directly to the appropriate and corresponding portion of a related applet.

Figure 3:
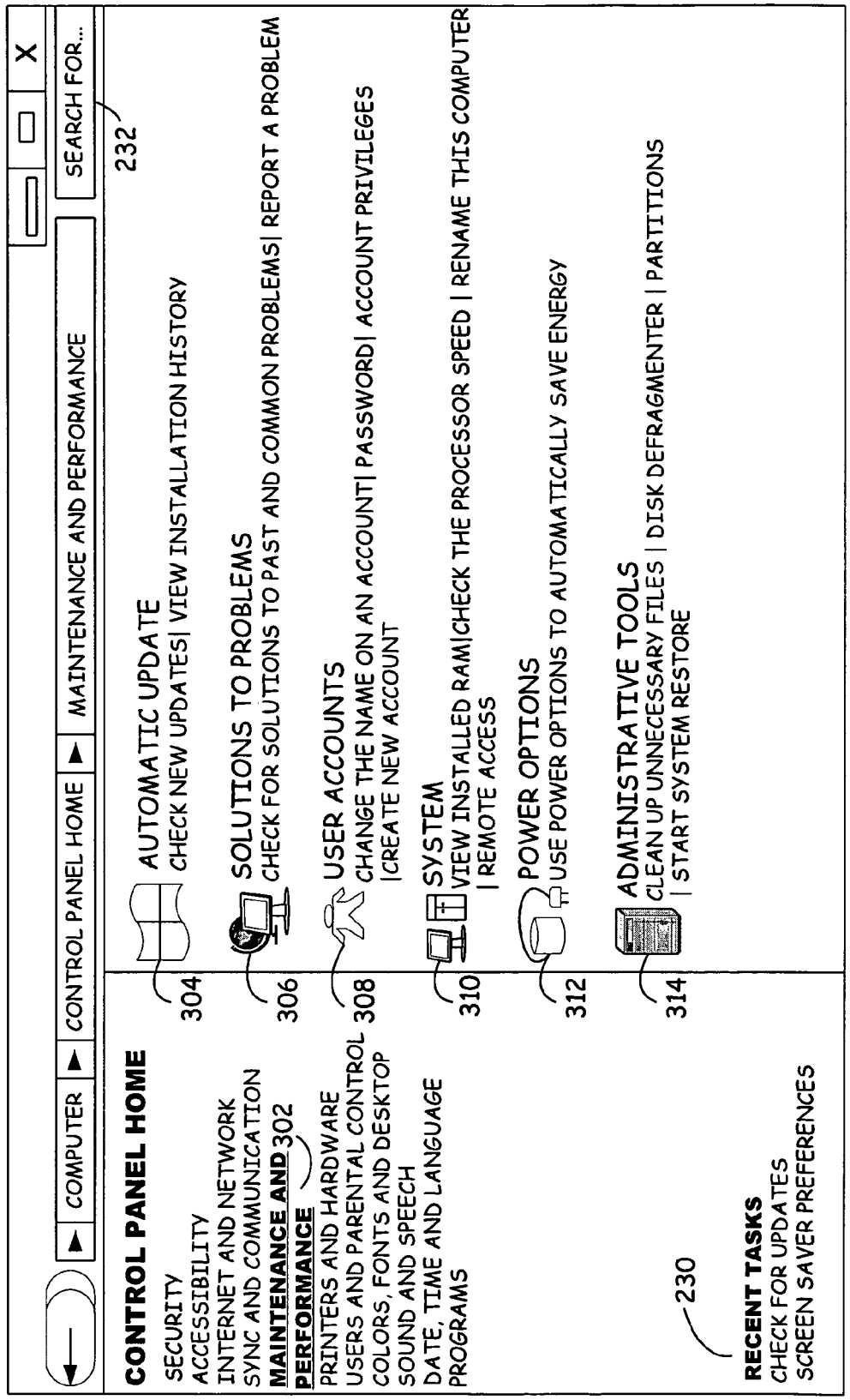
FIGS. 3 and 4 are exemplary screenshots representing control panel applet views.

FIG. 3, in accordance with one aspect of the present invention, is a representation of an exemplary screenshot 300. Screenshot 300 includes, similar to screenshot 200, a "Recent Tasks" access interface 230 and a "Search For" access interface 232.

Screenshot 300 shows the contents of a category upon selection (e.g., the result of drilling down from a selected category). Specifically, as is indicated at 302, screenshot 300 represents the contents of "Maintenance and Performance" category 206 (FIG. 2). As is reflected in FIG. 3, the contents of each category illustratively include a plurality of applets. The 'Maintenance and Performance' category includes applets 304-314. Beneath each applet are listed some tasks that each applet can accomplish. For example, the 'Automatic Update' applet 304 includes a first task "Check New Updates" and a second task "View Installation History". Selecting (e.g., clicking) one of the tasks will cause a jump directly to an appropriate and corresponding user interface, for example, a jump directly to the appropriate and corresponding portion of the related applet. Some of the tasks listed under the applets may or may not be the same as some of the tasks listed under the corresponding category on the home page component of the control panel user interface system. Each applet may include tasks in addition to those displayed in the applet view.

In accordance with one aspect of the present invention, applets associated with a given category may be provided either by the sponsor of the operating system or by other parties who install their own applets (and related tasks). Thus, in accordance with one aspect of the present invention, the control panel user interface is extensible at least in that new applets can be added and new tasks can be added to new applets. Embodiments of system mechanics for supporting the described system extensibility form part of the present invention and will be described subsequently in the present description.

It should be noted that it is within the scope of the present invention to expand the described system extensibility to encompass an ability to add categories, applets and tasks in any combination. For example, a user can add a new category. Or, a user can add new tasks to existing (e.g., pre-configured) applets. Or, a user can re-align existing (e.g., pre-configured) tasks with a new applet. These are only a few examples. All combinations of manipulation are within the scope of the present invention.

While a full extensibility system supporting all extensibility combinations is within the scope of the present invention, one aspect of the present invention pertains to implementation of restrictions to limit the scope of available options. In accordance with one embodiment, the scope of changes is limited to 1) adding new applets; and 2) adding new tasks to new applets. In one embodiment, in addition to these restrictions, the pre-configured set of categories is limited to the categories supplied by the sponsor of the operating system. Thus, a new applet can be added to an existing category. In one embodiment, to the extent that new tasks can be added, they can be added to a new applet but not an existing applet. When all these limitations are implemented simultaneously, there can be no intrusion upon existing categories, applets and task sets, such as those provided by the sponsor of the operating system. These limitations also prevent outside parties from spamming search results obtained in conjunction with searching interface 232.

Figure 4:
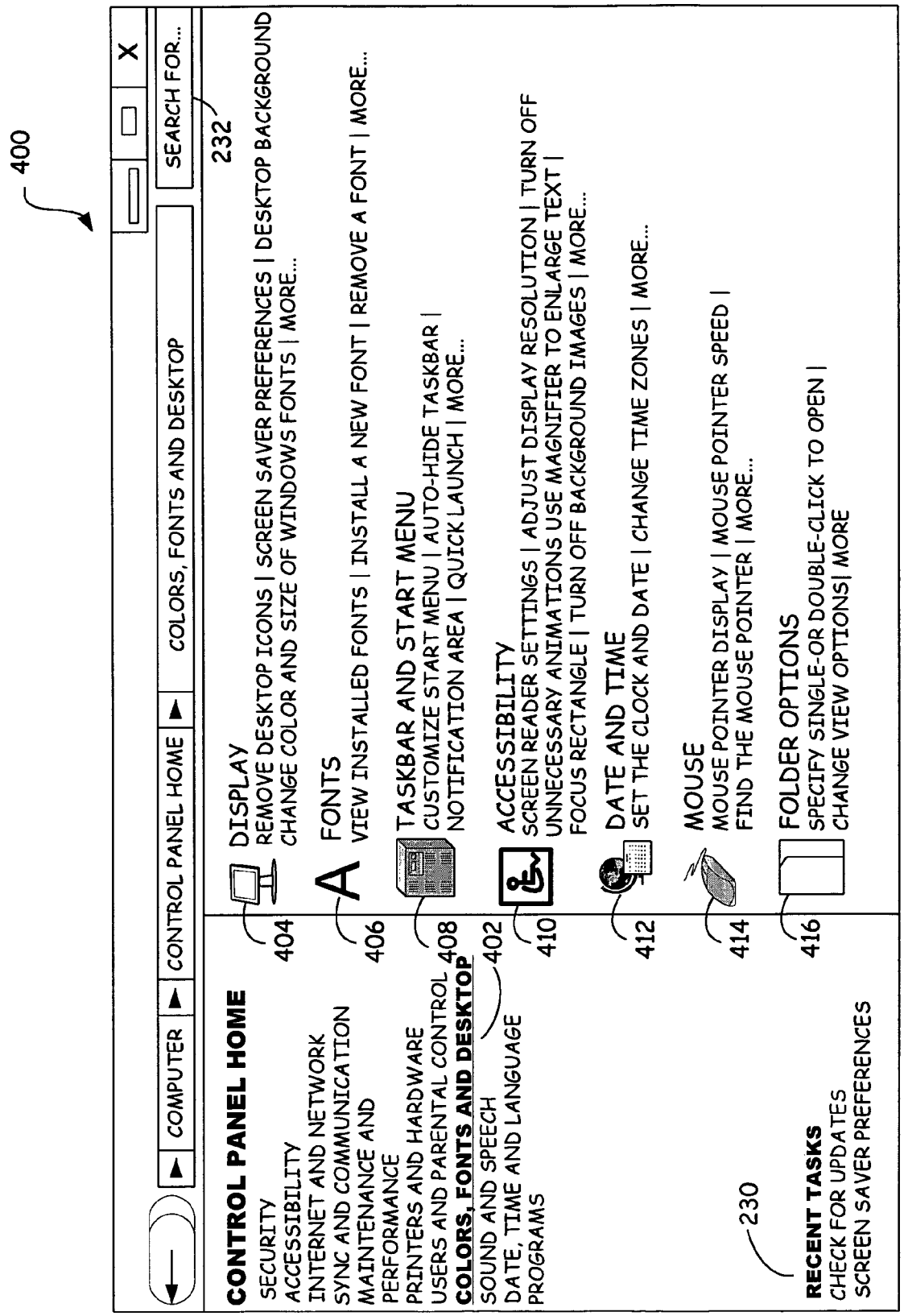

FIG. 4, in accordance with one aspect of the present invention, is a representation of an exemplary screenshot 400. Screenshot 400 includes, similar to screenshot 200, a "Recent Tasks" access interface 230 and a "Search For" access interface 232.

Screenshot 400 provides another example of the contents of a category. Specifically, as is indicated at 402, screenshot 400 represents the contents of "Colors, Fonts and Desktop" category 218 (FIG. 2). As is reflected in FIG. 4, the contents of each category illustratively include a plurality of applets. The 'Colors, Fonts and Desktop' category includes applets 404-416. Beneath each applet are listed a limited set of the tasks that each applet can accomplish. For example, the 'Fonts' applet 406 includes a first task "View Installed Fonts", a second task "Install a New Font" and a third task "Remove a Font". Selecting (e.g., clicking) one of the tasks will cause a jump directly to an appropriate and corresponding user interface, for example, a jump directly to the appropriate and corresponding portion of the related applet. Some of the tasks listed under the applets may or may not be the same as some of the tasks listed under the corresponding category on the home page component of the control panel user interface system.

It is worth now elaborating somewhat upon the description of searching interface 232. Interface 232 has been shown in the context of the control panel home page (FIG. 2) and the pages listing specific applets (FIGS. 3 & 4). However, it is within the scope of the present invention that this searching interface be accessible from any entry point, whether it be inside or outside of the actual control panel system.

Figure 5:
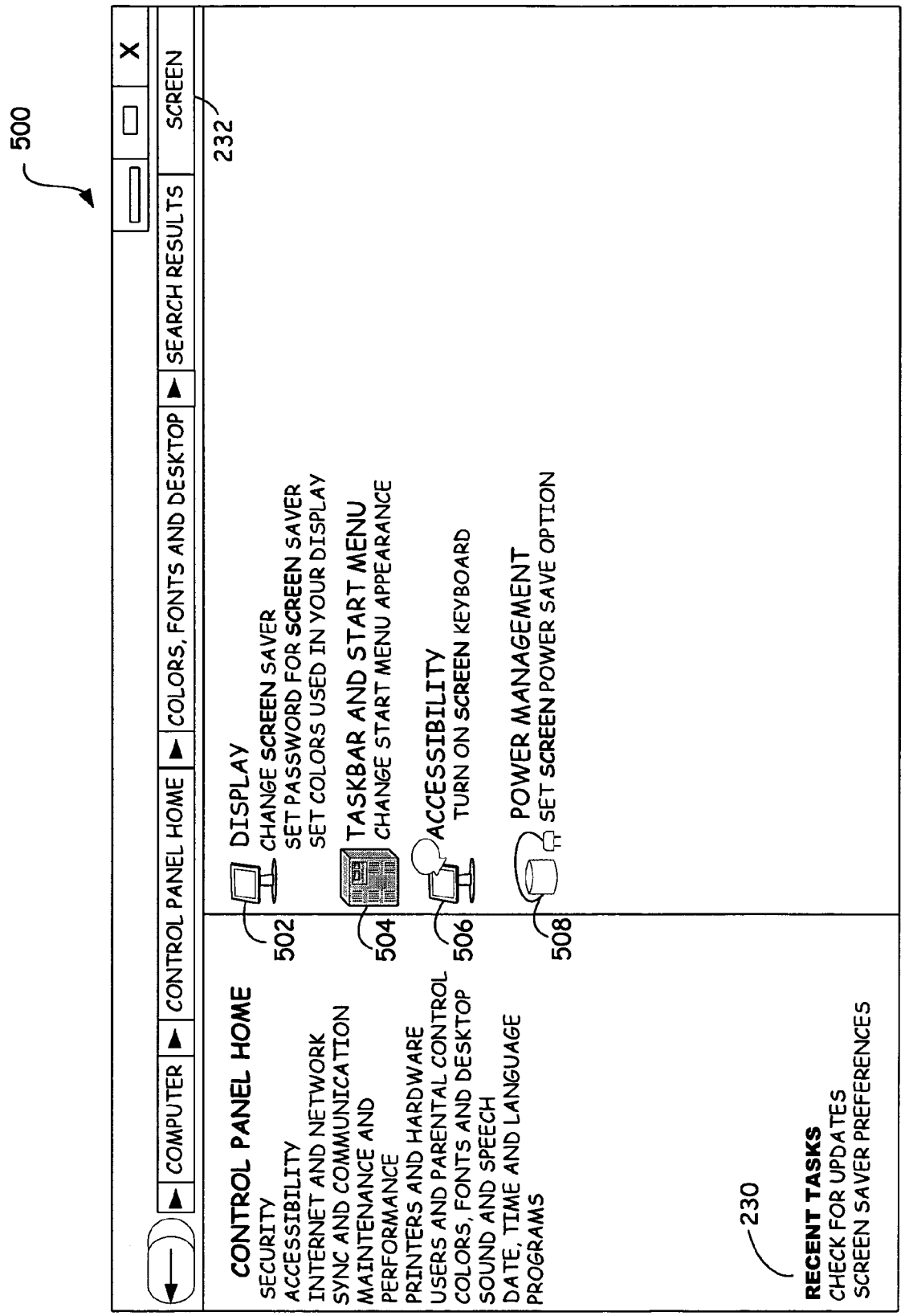
FIG. 5 is an exemplary screenshot representing a task search results view.

FIG. 5, in accordance with one aspect of the present invention, is a representation of an exemplary screenshot 500. Screenshot 500 includes, similar to screenshot 200, a "Recent Tasks" access interface 230 and a "Search For" access interface 232.

Screenshot 500 represents an example of a search results output. In this case, the user has illustratively typed "screen" into the search box and pressed 'enter' to execute a search (in one embodiment, 'enter' is not pressed because a search is conducted automatically as the user types such that results come back instantly, and are updated with each keystroke). The results are returned in the form of a list of matching tasks, grouped hierarchically beneath corresponding applets 502-508. This grouping scheme provides further context for the text of the task and helps to teach the purpose for each applet. As has been described above, the system can be configured to prevent third party applet sponsors (not the sponsor of the operating system) from adding tasks that might mislead a user as to their purpose or the purpose of an original applet. In one embodiment, the search looks through any combination of the text of the tasks, extra keywords associated with the tasks, and the applet names and descriptions.

In one embodiment, as is shown in FIG. 5 in the context of applets 502, 506 and 508, search terms are highlighted within the search results. As is shown in the context of applet 504, some search results may be returned based on a synonym equivalency as opposed to literal equivalency. For example, in the illustrated case, the task "Change Start Menu Appearance" matched with the search term "screen" through means other than a comparison to the text of the task (e.g., keywords).

It is worth now reiterating that embodiments of the present invention pertain to a conjunction of searching and tasks, including the organization of how search results are returned. The described system of showing tasks as related to the applet that completes them enables at least three advantages: 1) it enhances learning, as a user can better learn what tasks can be accomplished with what UI, allowing more direct access to the UI in the future; 2) it provides more information about the kinds of things the applet is useful for, in the event the user needs to perform a task that is not provided; and 3) when third parties extend the control panel with their own applets, they can add searchable tasks of their own, which can appear related to their applets, but cannot 'spam' the task lists of other applets.

IV. Overview: Extensible Task Framework

As has been described, one aspect of the present invention pertains to a control panel user interface that incorporates tasks for displayed categories and most, if not all, applets. A task is a selectable, descriptive link or button that, upon activation, facilitates execution of the action described by the content of the text or image. By providing a task-context for categories and applets, users can discover what an applet does and quickly execute a task.

In one embodiment of the present invention, tasks can be added to applets through a framework that uses a registration system (e.g., the registry system associated with the operating system) and descriptive metadata information (e.g., information implemented in XML file format). One benefit associated with an extensible framework is that third party applet developers (i.e., developers not associated with the sponsor of the operating system) can author and implement tasks. Thus, the user interface system is not required to be a closed system limited exclusively to tasks associated with applets shipping with the operating system.

The incorporation of descriptive task metadata that is not in compiled code enables the benefit of allowing non-programmers to author tasks (for example, they can add tasks by editing an XML file without compiling any code). In one embodiment of the present invention, the metadata contains search keywords and/or query phrases that serve as synonyms to be searched against search terms, such as when searching for control panel functionality through the described searching interface 232. In another embodiment, the described framework is built for backwards-compatibility such that applets do not need to be recompiled in order to present tasks in the category view (i.e., the view shown in FIG. 2). In yet another embodiment, a tool, such as a graphical, visual editor, is provided to assist task authors in the generation of task metadata information within the described framework.

V. Extensible Task Framework Components

Figure 6:
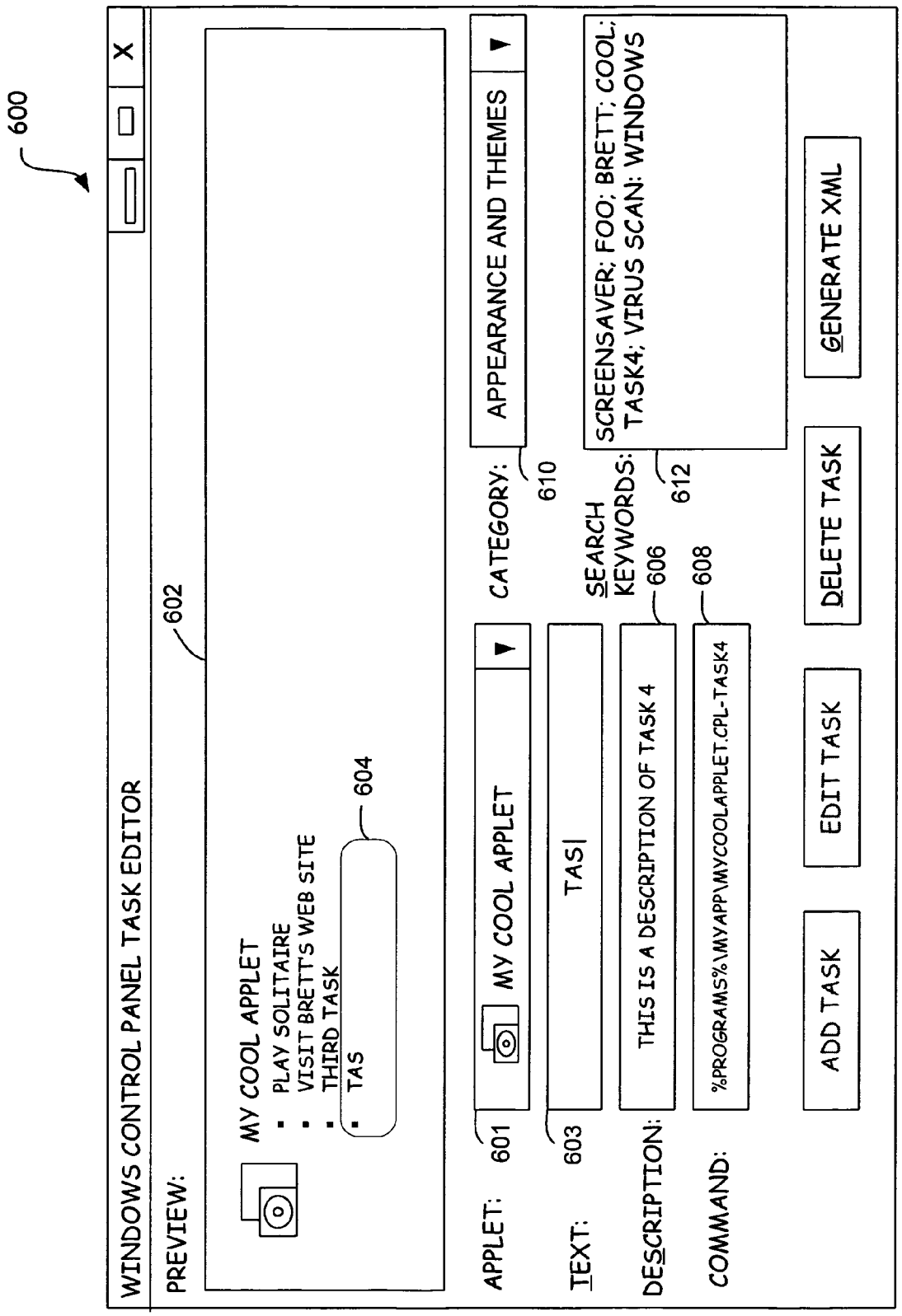
FIG. 6 is an exemplary screenshot representing a tool for facilitating creation of a task.

FIG. 6, in accordance with one aspect of the present invention, is a representation of an exemplary screenshot 600. Screenshot 600 is one example of a user interface associated with a tool provided to support task authors in the creation of a new task. In one embodiment, by filling out various fields associated with the visual representation of the tool, an author creates a specialized collection of task metadata, thereby enabling support for a new task.

Screenshot 600 includes an applet selection field 601. In this field, the author selects an applet to which the new task will be added. As has been described, in one embodiment, the user is limited to adding tasks only to new (i.e., not pre-configured) applets. Once an applet has been selected, the display of that applet, including a set of associated tasks, appears in a preview window 602. In one embodiment, the author is provided with means for determining which (if not all) tasks are displayed in the context of the corresponding applet.

In the illustrated case, the author has manipulated field 601 to select the "My Cool Applet" applet, which is then displayed in preview window 602. In field 603, the author enters the text of a new task to be created and added to the selected applet. In the illustrated case, the author has so far entered the text "TAS". As is illustrated by field 604, as text for the new task is entered, it appears in preview window 602.

A description of the new task is entered into field 606. Depending on how the system is configured, the terms entered into field 606 will be compared during a search process, such as when a user searches for tasks through searching interface 232. In field 612 are entered keywords to be included in the searching process. In field 608 is entered a location corresponding to the source of functionality associated with the new task. As is indicated by field 610, the author is able to designate a category to which the applet designated in 601 should be assigned. When an applet is first selected, its current category will appear in field 610 but can be changed based on the author's preferences. As has been described, in one embodiment, each applet must be assigned to one of the pre-configured categories (i.e., there is a restriction against creation of a new category). In accordance with one embodiment, the tool enables the author to create new applets, each of which is assigned to a pre-configured category, and is assigned tasks as the author desires.

As is indicated by the four buttons at the bottom of screenshot 600, the author is able to use the tool to add tasks, edit an existing task (illustratively restricted to new, not pre-configured tasks) or generate XML. Generating XML enables the author to generate the descriptive task metadata that supports creation of a task as indicated. A purpose and function of such metadata will become apparent following the description of FIG. 7 below.

Figure 7:
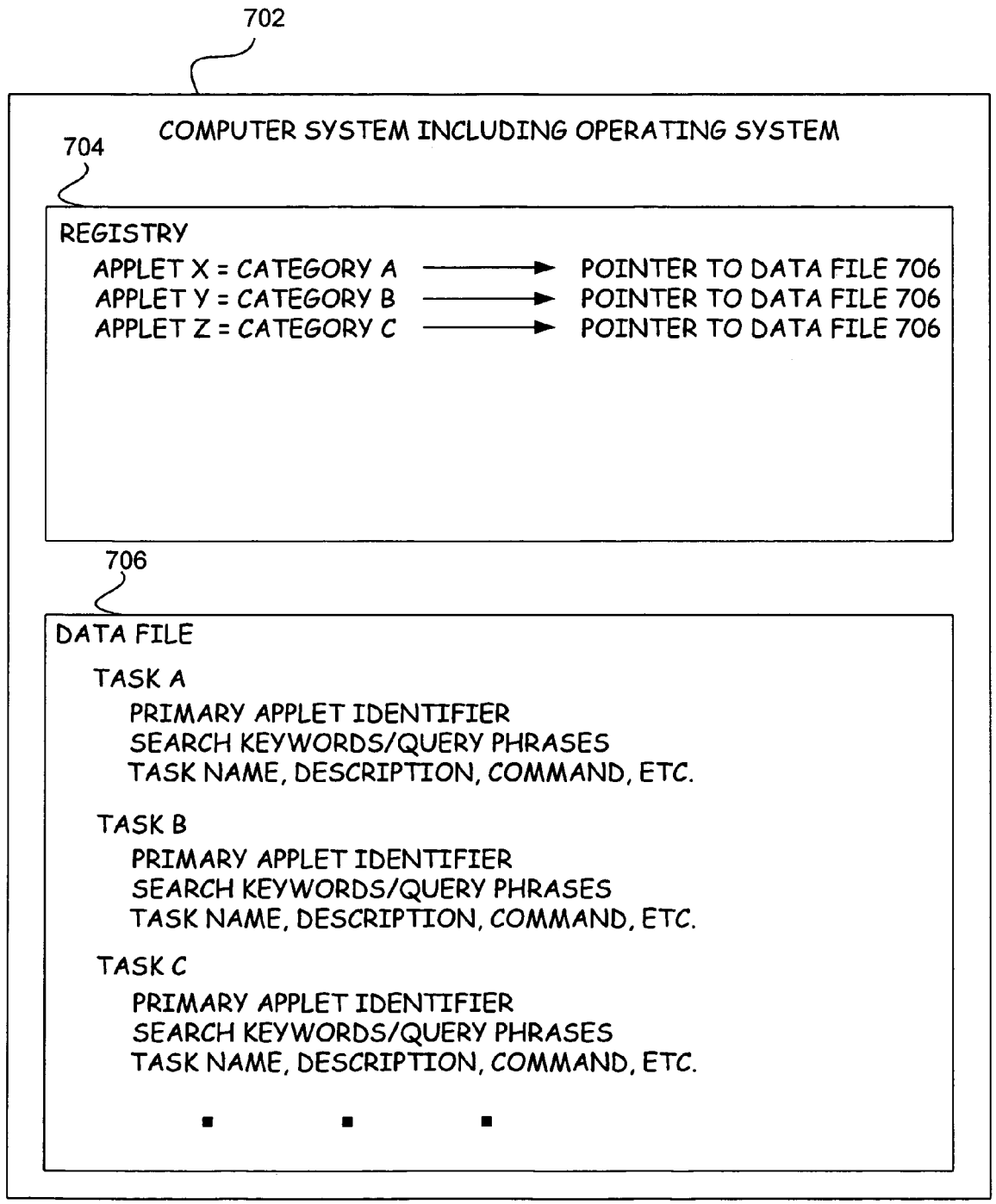
FIG. 7 is a schematic diagram demonstrating a data management scheme.

FIG. 7, in accordance with one embodiment of the present invention, is a schematic diagram demonstrating a data management scheme for supporting the described embodiments of a control panel extensible task framework. A computer system 702 illustratively includes an operating system. The operating system illustratively includes a registry 704. The computer system also includes a data file (e.g., an XML file) 706.

In accordance with one aspect of the present invention, when a request for the control panel category view (i.e., FIG. 2) is received, display information is retrieved and processed for each category. In addition, applets that correspond to each category are enumerated using the operating system registry and file system.

As is shown in FIG. 7, applets are aligned in the registry with corresponding categories. To simplify the Figure, only a few applets (X, Y and Z) have been included in the illustration. For each applet, there is a registry entry that points to a data file (e.g., an XML file) that is parsed to extract the corresponding applets tasks. FIG. 7 shows applets x, y and z pointing to a data file 706, which contains a directory of tasks with identifiers to link them to one or more applets (for simplification, only three tasks are illustrated in data file 706). It should be noted that it is within the scope of the present invention that the data file be instead implemented from within the file system of the operating system or as an embedded resource. All similar or equivalent implementations are also within the scope of the present invention.

As will be recognized by those skilled in the art, the specific configuration illustrated in FIG. 7 is only one of many ways to implement the described functionality. All similar variations are to be considered within the scope of the present invention. While FIG. 7 would seem to imply that an applet must register a category before pointing to a data file, this is not necessarily the case. In accordance with one embodiment, an applet is configured to register these two pieces of data independently.

In accordance with one aspect of the present invention, for each task, the metadata in file 706 will include any of a display name (optionally localized into multiple languages), a task name, a descriptive tool tip (optionally localized), a command to run when the task is invoked, a task description, and optional states to check before displaying the task. Other descriptive metadata, such as keywords or related search queries, are also potentially included to enable the tasks to be exposed in task search results. An example of a state check is to not show an "Add New User" task if the current user is not an Administrator on the computer. In one embodiment, there is additional metadata that determines which tasks appear when an applet appears under different categories, as well as the order in which tasks appear. In one embodiment, task names and descriptions can be overridden when appearing under specified categories.

As has been described, one aspect of the present invention pertains to a tool provided to support an author in making the registry and/or data file entries necessary to manipulate the extensible framework. In one embodiment, as was alluded to in FIG. 6, a visual editor is configured to abstract the underlying data management schema for task authors by enabling them to information such as, but not necessarily limited to, a task name, a description, and a command. This saves the author the trouble of direct editing, such as direct editing of an XML file. The tool also illustratively supports a simplified ability (i.e., without direct coding) to specify task state checks. The tool also illustratively supports a simplified ability to specify which tasks appear under which applets for each category, as well as an ability to override task names and descriptions. As has been described, one embodiment pertains to the provision of a virtual screenshot demonstrating what the applet will look like with its list of tasks. Such a screenshot can be drawn so the user doesn't need to actually load the task in the control panel to see what is being edited.

In accordance with another embodiment, the described data management scheme includes an internal data file (e.g., an XML file) (not illustrated in FIG. 7) that references tasks that should appear under each category in the category view home page (e.g., FIG. 2). A similar file can be implemented to determine tasks displayed in the applet views (e.g., FIGS. 3 & 4). As categories or applets are added, their associated tasks can be designated as selectable hyperlinks. Those skilled in the art will appreciate that there are many obvious means for implementing a system to police or restrict which tasks are or are not displayed in various views or windows.

It should be noted that the embodiments of data management associated with the present invention are not limited to a registry system associated with an operating system. Other registry systems can be similarly implemented without departing from the scope of the present invention. Similarly, the embodiments of data management are not limited to implementation of any particular data file system. For example, any data file other than XML data files can be similarly implemented without departing from the scope of the present invention. Also, without departing from the scope of the present invention, the line between the functionality of the registry system and the functionality of the data file can be manipulated. For example, elements tracked in the data file can alternatively be tracked in the registry, and vice versa.

In summary, embodiments of the present invention pertain to a system that enables users to more quickly jump to the area of a control panel applet's user interface that relates to the desired task. Task buttons in the control panel category view are illustratively associated with metadata to support the task shortcut. Instead of requiring users to open an applet then search its windows or tabs for the task they intend to complete, they can simply click a task button that enables a jump straight to an appropriate applet component for performing the task. In one embodiment, the jump is straight to an active content wizard or guided help component that provides guidance for completing the task.

Other embodiments of the present invention pertain to an underlying XML file metadata schema and registration system that supports applet developers in the addition and manipulation of tasks. Through this schema, developers are not forced to write compiled code modules to enable their applets to show tasks in a category view; instead, a data file contains the task metadata. In one embodiment, a tool (e.g., a graphical, visual editor) is provided to support applet developers. In one embodiment, the tool enables applet developers to author tasks in a manner that is far easier than utilization of a text editor.

Although the present invention has been described with reference to particular embodiments, workers skilled in the art will recognize that changes may be made in form and detail without departing from the spirit and scope of the invention.

What is claimed is:

1. A computer-implemented method for enabling a user to efficiently navigate to a portion of a user interface configured to support performance of a particular task, the method comprising:
   receiving from the user a search input that includes a description of the particular task, wherein receiving comprises receipt by a processor associated with the computer, and wherein receiving further comprises receiving input communicated through a searching interface implemented as part of an operating system control panel user interface, the operating system control panel user interface being an interface that is part of a software operating system that manages hardware connected by a bus to the processor;
   utilizing the processor to process the search input and to identify a result set that corresponds to the description;
   utilizing the processor to render, and to present to the user, a search results output window on a display device associated with the computer, the window being rendered and presented in response to the user search input, wherein the window includes a visible rendering of the result set in the form of a plurality of selectable candidate tasks that correspond to said description, the window also including the plurality of selectable candidate tasks displayed relative to an also visibly rendered indication of at least one corresponding applet, and wherein the plurality of selectable candidate tasks and the indication of at least one corresponding applet are simultaneously rendered on the display device within the window:
   wherein the plurality of candidate tasks each include a selectable string of text that is at least partially descriptive of an underlying task and that, upon selection, supports a transfer to a corresponding portion or the user interlace, and wherein one or more of the selectable strings of text includes a word that was in the user search input, and wherein the word in the one or more of the selectable strings is highlighted in the search results output window; and
   wherein upon selection of the plurality of selectable candidate tasks, the processor supports a transfer to a corresponding portion of the user interface that supports performance of the task.

2. The method of claim 1, wherein utilizing the processor to render, and to present to the user, a search results output window further comprises including within the window an indication of the user search input, a plurality of user selectable categories, and a plurality of user selectable recent tasks, wherein upon a selection of one of the user selectable categories, the processor supports a transfer to a portion of the user interface that displays a plurality of applets that correspond to the one of the user selectable categories, and wherein the plurality of user selectable recent tasks includes tasks that have been recently selected by the user.

3. The method of claim 2, wherein utilizing the processor to identify the result set comprises comparing textual components of the description of the particular task to textual components of identifiers associated with each of the candidate tasks.

4. The method of claim 2, wherein utilizing the processor to identify the result set comprises comparing textual components of the description of the particular task to keywords or key phrases associated with the candidate tasks.

5. The method of claim 2, wherein, for a given candidate task, utilizing the processor to identify the result set comprises comparing textual components of the description of the particular task to keywords or key phrases stored within a data file associated with the given candidate task.

6. The method of claim 2, wherein receiving further comprises receiving input that represents a description of the particular task in a combination of letters different than any combination of letters incorporated into the task description.

7. In a computer system having a graphical user interface including a display, a method of providing a menu on the display, the method comprising the steps of:
   receiving a user search input in the form of a series of keystrokes as an indication of a particular task;
   retrieving a set of candidate tasks bearing a predetermined association with the indication of the particular task, wherein retrieving a set of candidate tasks comprises automatically retrieving a set of candidate tasks with each of the keystrokes;
   displaying in response to the user search input, on a display device associated with the computer system, each candidate task from said set in association with an indication of a corresponding applet, wherein each candidate task and its indication of a corresponding applet are simultaneously rendered on the display device, and wherein displaying in response to the user input further comprises displaying the set of candidate tasks grouped hierarchically beneath the corresponding applets, displaying a recent tasks access interface, displaying a search access interface, and displaying a plurality of selectable categories, and wherein displaying in response to the user search input still further comprises displaying in response to each of the keystrokes;
   receiving a menu entry selection signal indicative of a user interface selection device pointing at one of the candidate tasks included in the set;
   receiving an execution signal indicative of a user selecting said one of the candidate tasks, and in response to the execution signal, updating the graphical user interface with information pertinent to execution of a task associated with said one of the candidate tasks;

wherein updating the graphical user interface comprises providing access to a guided help component that is a portion of a particular applet, the guided help component providing guidance for completing said one of the candidate task, the particular applet being an applet that corresponds to the applet indication with which the said one of the candidate tasks is displayed on the display device;

wherein each step of the method is executed by a computer processor associated with the computing system, said execution being part of execution of a series of computer-readable instructions embedded on a computer-readable storage medium, and wherein the sequential order of the steps is first receiving a user search input, second retrieving a set of candidate tasks, third displaying in response to the user search input, fourth receiving a menu entry selection signal, and fifth receiving an execution signal.

8. The method of claim 7, wherein retrieving a set of candidate tasks bearing a predetermined association with an indication of a particular task comprises retrieving a set of candidate tasks having a descriptor with textual components that correspond to textual components of the indication of the particular task.

9. The method of claim 7, wherein retrieving a set of candidate tasks bearing a predetermined association with an indication of a particular task comprises retrieving a set of candidate tasks having an associated keyword or key phrase that corresponds to textual components of the indication of the particular task.

10. The method of claim 7, wherein retrieving a set of candidate tasks bearing a predetermined association with an indication of a particular task comprises comparing textual components stored within a data file to textual components of the indication of the particular task.

11. The method of claim 7, wherein retrieving a set of candidate tasks comprises utilizing a natural language search process.

12. The method of claim 7, wherein retrieving a set of candidate tasks comprises utilizing word breaking, wherein word breaking comprises separating the user search input into two or more words.

13. The method of claim 7, wherein retrieving a set of candidate tasks comprises utilizing synonyms associated with the user search input.

14. The method of claim 7, wherein retrieving a set of candidate tasks comprises utilizing a stemming process to remove letters from the user search input.

* * * * *

UNITED STATES PATENT AND TRADEMARK OFFICE
CERTIFICATE OF CORRECTION

| | | |
|---|---|---|
| PATENT NO. | : 7,703,037 B2 | Page 1 of 1 |
| APPLICATION NO. | : 11/109997 | |
| DATED | : April 20, 2010 | |
| INVENTOR(S) | : Andrew John McGlinchey et al. | |

It is certified that error appears in the above-identified patent and that said Letters Patent is hereby corrected as shown below:

In column 11, line 67, in Claim 1, delete "or" and insert -- of --, therefor.

In column 12, line 1, in Claim 1, delete "interlace" and insert -- interface --, therefor.

Signed and Sealed this

Nineteenth Day of July, 2011

David J. Kappos
*Director of the United States Patent and Trademark Office*